(12) United States Patent
Iwabuchi et al.

(10) Patent No.: US 9,557,891 B2
(45) Date of Patent: Jan. 31, 2017

(54) INFORMATION SUPPLY DEVICE

(75) Inventors: Shigaku Iwabuchi, Chiyoda-ku (JP); Soh Masuko, Shinagawa-ku (JP); Kenzo Nirasawa, Tsukuba (JP); Jiro Tanaka, Tsukuba (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/983,344

(22) PCT Filed: Jun. 13, 2011

(86) PCT No.: PCT/JP2011/063530
§ 371 (c)(1),
(2), (4) Date: Aug. 2, 2013

(87) PCT Pub. No.: WO2012/105069
PCT Pub. Date: Aug. 9, 2012

(65) Prior Publication Data
US 2014/0047387 A1    Feb. 13, 2014

(30) Foreign Application Priority Data

Feb. 4, 2011   (JP) .................................. 2011-022963

(51) Int. Cl.
*G06F 3/048*   (2013.01)
*G06F 3/0482*   (2013.01)
(Continued)

(52) U.S. Cl.
CPC ......... *G06F 3/0482* (2013.01); *G06Q 30/0253* (2013.01); *G06Q 30/0255* (2013.01); *G06Q 30/06* (2013.01); *G06Q 30/0631* (2013.01)

(58) Field of Classification Search
CPC ............................. G06Q 30/00; G06F 3/0482
(Continued)

(56) References Cited

U.S. PATENT DOCUMENTS 5,983,220 A * 11/1999 Schmitt ............. G06F 17/30398
6,385,602 B1 * 5/2002 Tso .................... G06F 17/30696
(Continued)

FOREIGN PATENT DOCUMENTS

JP    2003-157375 A    5/2003
JP    2006-251866 A    9/2006
(Continued)

OTHER PUBLICATIONS

Douglas K. van Duyne et al., "The Design of Sites: Patterns for Creating Winning Web Sites," Dec. 14, 2006, Prentice Hall, 2nd Ed., pp. 1-19 (corresponding to Chapters F3 and G2).*
(Continued)

*Primary Examiner* — Dino Kujundzic
(74) *Attorney, Agent, or Firm* — Sughrue Mion, PLLC

(57) ABSTRACT

An online shopping server (10) includes a receiving unit (17a) that, when a plurality of first item information are selected by a user operation on a user terminal (T), acquiring the plurality of selected first item information, a retrieval unit (17b) that recognizes a common item attribute among the plurality of acquired first item information and reads item information different from the plurality of first item information and corresponding to the common item attribute as second item information from an item database (14), and a transmitting unit (17c) that outputs the read second item information in order to display the second item information together with the common item attribute on the user terminal (T).

9 Claims, 12 Drawing Sheets

(a)

(b)

(51) Int. Cl.
*G06Q 30/06* (2012.01)
*G06Q 30/02* (2012.01)

(58) Field of Classification Search
USPC .......................................................... 715/810
See application file for complete search history.

(56) References Cited

U.S. PATENT DOCUMENTS

| | | | |
|---|---|---|---|
| 7,072,902 B2* | 7/2006 | Kleinberger | G06F 17/30873 |
| 7,346,561 B1* | 3/2008 | Devitt | G06Q 10/087 |
| | | | 705/26.61 |
| 7,720,720 B1* | 5/2010 | Sharma | G06Q 30/0631 |
| | | | 705/26.7 |
| 8,296,291 B1* | 10/2012 | Desjardins | 707/723 |
| 8,660,912 B1* | 2/2014 | Dandekar | G06Q 30/06 |
| | | | 705/26.1 |
| 8,713,064 B1* | 4/2014 | Khafizov | G06F 17/30991 |
| | | | 707/708 |
| 2002/0019763 A1* | 2/2002 | Linden | G06Q 30/02 |
| | | | 705/14.53 |
| 2002/0051020 A1* | 5/2002 | Ferrari | G06F 17/30873 |
| | | | 715/854 |
| 2006/0106793 A1* | 5/2006 | Liang | G06F 17/30654 |
| 2006/0173872 A1* | 8/2006 | Koike | G06Q 30/02 |
| 2006/0212362 A1* | 9/2006 | Donsbach | G06Q 30/06 |
| | | | 705/26.64 |
| 2006/0217962 A1 | 9/2006 | Asano | |
| 2008/0104032 A1* | 5/2008 | Sarkar | G06F 17/3089 |
| 2009/0043674 A1* | 2/2009 | Minsky | G06Q 30/0603 |
| | | | 705/26.8 |
| 2010/0049707 A1* | 2/2010 | Faria et al. | 707/5 |
| 2010/0076867 A1 | 3/2010 | Inoue et al. | |
| 2010/0153187 A1 | 6/2010 | Ghani et al. | |
| 2011/0078055 A1* | 3/2011 | Faribault et al. | 705/27.2 |

FOREIGN PATENT DOCUMENTS

| | | |
|---|---|---|
| JP | 2008-282098 A | 11/2008 |
| JP | 2010-134733 A | 6/2010 |
| KR | 2001-0070705 A | 7/2001 |

OTHER PUBLICATIONS

Amazon official application which mounts "Photo Search" enjoys high popularity [@maskin], URL:http://techwave.jp/archives/51461554.html, Jun. 7, 2010.
Amazon provides an application for iPhone for free. "Photo Search" using a camera is also available, URL: http://web-tan.forum.impressrd.jp/e/2010/06/18/8185, Jun. 18, 2010.
International Search Report for PCT/JP2011/063530 dated Sep. 13, 2011.
International Preliminary Report on Patentability with Written Opinion dated Aug. 15, 2013, issued in International Patent Application No. PCT/JP2011/063530.
Korean Office Action dated Mar. 10, 2014 issued in Korean Patent Application No. 10-2013-7022781.
Canadian Office Action issued in Application No. 2825113 dated Feb. 7, 2014.

* cited by examiner

Fig.7

| ITEM ID | ITEM NAME | AUTHOR | ERA | PUBLICATION ON MAGAZINE | PUBLISHER | ITEM IMAGE |
|---|---|---|---|---|---|---|
| B001 | AAA Vol.1 | AUTHOR A | 2009 | KKK | XXX | ... |
| B002 | AAA Vol.2 | AUTHOR A | 2009 | KKK | XXX | ... |
| B003 | BBB | AUTHOR B | 2008 | KKK | XXX | ... |
| ... | ... | ... | ... | ... | ... | ... |

14

INFORMATION SUPPLY DEVICE

CROSS REFERENCE TO RELATED APPLICATIONS

This application is a National Stage of International Application No. PCT/JP2011/063530 filed Jun. 13, 2011, claiming priority based on Japanese Patent Application No. 2011-022963 filed Feb. 4, 2011, the contents of all of which are incorporated herein by reference in their entirety.

TECHNICAL FIELD

One embodiment of the present invention relates to an information providing device, an information providing method, an information providing program, and a computer-readable recording medium storing the program.

BACKGROUND ART

A framework that recommends (suggests) an item related to an item that has been viewed or purchased based on a viewing history or a purchase history of a user in an online shopping service is known. Further, a recommendation service that sets a related item of a certain item or a recommended item and presents those items to a user is also known.

Relating to such services, an item recommendation system that determines a recommended item in a complex manner from multiple points of view is disclosed in Patent Literature 1 below. In this system, a recommendation server performs a hybrid recommendation process that determines a recommended item in a complex manner from two points of view with use of an item correlation information storage means and an individual item correlation information storage means and then displays the recommended item in a recommended item section in an item page.

CITATION LIST

Patent Literature

PTL 1: JP 2008-282098 A

SUMMARY OF INVENTION

Technical Problem

However, in the technique according to related art as disclosed in the above Patent Literature 1, a user is unable to know from what point of view the system has extracted a related item (for example, a recommended item).

It is therefore demanded to let a user know from what point of view a related item has been extracted.

Solution to Problem

An information providing device according to one aspect of the invention includes an acquisition means for, when a plurality of first item information are selected by a user operation on a given screen that is displaying first item information as objects selectable by a user, acquiring the plurality of selected first item information, a retrieval means for recognizing a common item attribute among the plurality of first item information acquired by the acquisition means and reading item information different from the plurality of first item information and corresponding to the common item attribute as second item information from an item database, and an output means for outputting the second item information read by the retrieval means in order to display the second item information together with the common item attribute on the screen.

An information providing method according to one aspect of the invention is an information providing method executed by an information providing device, the method including an acquisition step of, when a plurality of first item information are selected by a user operation on a given screen that is displaying first item information as objects selectable by a user, acquiring the plurality of selected first item information, a retrieval step of recognizing a common item attribute among the plurality of first item information acquired in the acquisition step and reading item information different from the plurality of first item information and corresponding to the common item attribute as second item information from an item database, and an output step of outputting the second item information read in the retrieval step in order to display the second item information together with the common item attribute on the screen.

An information providing program according to one aspect of the invention causes a computer to function as an acquisition means for, when a plurality of first item information are selected by a user operation on a given screen that is displaying first item information as objects selectable by a user, acquiring the plurality of selected first item information, a retrieval means for recognizing a common item attribute among the plurality of first item information acquired by the acquisition means and reading item information different from the plurality of first item information and corresponding to the common item attribute as second item information from an item database, and an output means for outputting the second item information read by the retrieval means in order to display the second item information together with the common item attribute on the screen.

A computer-readable recording medium according to one aspect of the invention stores an information providing program that causes a computer to function as an acquisition means for, when a plurality of first item information are selected by a user operation on a given screen that is displaying first item information as objects selectable by a user, acquiring the plurality of selected first item information, a retrieval means for recognizing a common item attribute among the plurality of first item information acquired by the acquisition means and reading item information different from the plurality of first item information and corresponding to the common item attribute as second item information from an item database, and an output means for outputting the second item information read by the retrieval means in order to display the second item information together with the common item attribute on the screen.

In the above aspects, information (second item information) of other items corresponding to an item attribute common to a plurality of items selected by a user is extracted. Then, the extracted second item information and the common item attribute are displayed on a screen. In this manner, by displaying not only information (second item information) of items related to selected items but also a common item attribute, which is a common point of items, used for extracting the information, it is possible to let a user know from what point of view the recommended items are extracted.

In the information providing apparatus according to another aspect, when there are a plurality of common item attributes, the acquisition means may further acquire one common item attribute selected by the user, and the retrieval means may recognize the one common item attribute acquired by the acquisition means and read item information different from the plurality of first item information and corresponding to the common item attribute as the second item information from the item database. A user can thereby view the second item information corresponding to the common item attribute selected by oneself.

In the information providing apparatus according to another aspect, the number of second item information displayed on the screen may be determined in accordance with a distance between the plurality of displayed first item information selected by the user, and, when the distance changes by a user operation, the number of displayed second item information may change in accordance with the distance after change. By changing the number of displayed second item information in accordance with a distance of display, it is possible to present the second item information in a manner which is easily viewable for a user.

In the information providing apparatus according to another aspect, a user interface displayed on the screen may include a first area to display the first item information and a second area to display item information selected from the first item information by the user, the second item information, and the common item attribute.

In the information providing apparatus according to another aspect, the user interface may be able to accept a user operation to move the second item information displayed in the second area to the first area, and the second item information moved to the first area may be stored into a specified database. A user can thereby store the extracted information (second item information) of related items into a database.

In the information providing apparatus according to another aspect, the user interface may be able to accept a user operation to switch the second item information displayed in the second area to different second item information, and the displayed second item information may be switched by the user operation. A user can thereby view the second item information by switching between them.

In the information providing apparatus according to another aspect, the second item information may be arranged in an order based on a specified item attribute, and the second item information may be displayed alternately by switching between one another in accordance with the order. By displaying the second item information in an orderly sequence, it is possible to present the second item information in a user-friendly manner.

In the information providing apparatus according to another aspect, the first item information may be information extracted by referring to a database that stores at least one of data indicating a history of viewing of item pages by a user, data indicating a history of item purchase by a user, and data indicating items registered as a favorite by a user's specified operation. In this case, a user can view information of items related to items that have been viewed, purchased or registered as a favorite together with grounds for extraction.

Advantageous Effects of Invention

According to one aspect of the present invention, not only information of an item related to an item selected by a user but also a common item attribute (common point of items) used for extracting the information are displayed, and it is thereby possible to let a user know from what point of view a related item has been extracted.

BRIEF DESCRIPTION OF DRAWINGS

FIG. 7 is a diagram showing a configuration example of an item database shown in FIG. 5.

DESCRIPTION OF EMBODIMENTS

An embodiment of the present invention is described hereinafter in detail with reference to the appended drawings. In this embodiment, an information providing device according to one embodiment of the present invention is applied to an online shopping server. Note that, in the description of the drawings, the same or equivalent elements are denoted by the same reference symbols, and the redundant explanation thereof is omitted.

First, the functions and configuration of an online shopping server 10 according to an embodiment are described with reference to FIGS. 1 to 7. The online shopping server 10 (see FIG. 4, which is described later) is a computer that executes processing such as viewing of item information and a procedure to purchase an item based on an instruction from a user terminal T. Further, the online shopping server 10 has a function to display other items related to items which a user has viewed or purchased in the past as recommended (suggested) items on the user terminal T. This recommendation function is particularly described hereinbelow.

Prior to specifically describing the online shopping server 10, a user interface (which is referred to hereinafter simply as "interface") that displays recommended items on the user terminal T and the way the recommended items are displayed are described. The interface is generated and displayed on a screen as a result that a specified application program is executed on the user terminal T. The interface may be a part of the screen or the screen itself. Note that the application program includes a web browser that can run Flash or JavaScript (which are trademarks or registered trademarks).

Examples of the user terminal T include an advanced mobile phone (smart phones), a personal digital assistant (PDA), a personal computer (tablet PC, notebook computer, desktop computer etc.), a projector and the like, though the variety of the user terminal T is not limited thereto. In the case where the user terminal T is equipped with a display or connected to a display, the interface is displayed on that display. In the case where the user terminal T is a projector, the interface is projected onto a screen, a wall surface, a desk or the like rather than on a display device.

Figure 1:
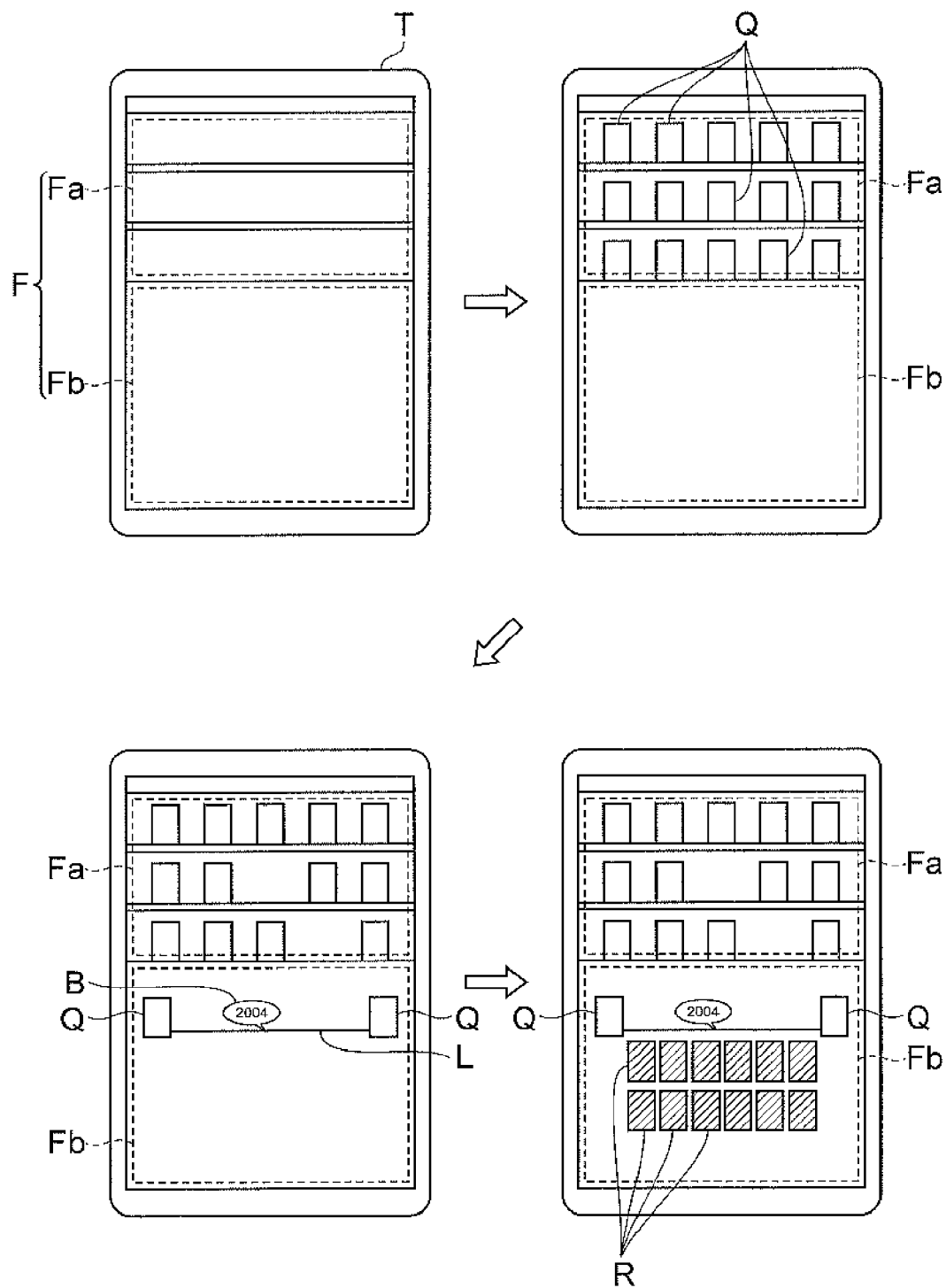
FIG. 1 is a diagram showing transition of screens in a user interface that displays recommended items.

FIG. 1 shows an example of the interface. The interface F in FIG. 1 is made up of an area that looks like a bookshelf (bookshelf view) Fa and an area that looks like a table (table view) Fb. The interface F assumes books, magazines, DVD, CD and the like as items to be displayed. In FIG. 1, it is assumed that the user terminal T is a tablet PC.

Although the following description is based on the assumption that the interface is that shown in FIG. 1 and the item is a book in this embodiment, the configuration of the interface and the type of the item are not particularly limited. For example, for an item such as liquor or wine, an interface that looks like a wine cellar or a refrigerator may be used, and for an item such as clothes, an interface that looks like a closet may be used, instead of a bookshelf. As a matter of course, the interface does not necessarily look like a storage box such as a bookshelf or a refrigerator. The item is not limited to a tangible object and may be a service such as hotel booking.

The bookshelf view Fa in this embodiment is an area (first area) to display items which a user has viewed or purchased in the past or items which a user has registered as a favorite on the online shopping server 10. In other words, the bookshelf view Fa is an area to display items which a user has accessed intentionally. On the other hand, the table view Fb is an area (second area) to display items which a user has moved from the bookshelf view Fa by a specified operation (for example, swipe), recommended items related to those items, and grounds for recommendation. In other words, the table view Fb is an area to display items which a user has not been aware of and items which have a potential possibility of being purchased by a user. Items that are initially displayed in the bookshelf view Fa can be regarded as the search criteria for recommended items. In this embodiment, items that are initially displayed in the bookshelf view are referred to as "query items".

Immediately after starting up the interface F, none of query items and recommended items are displayed (see the upper left of FIG. 1). After that, when a request for query items is sent to the online shopping server 10 by a program that manages the interface F, information of query items is provided from the server 10 in response to the request, and the information is displayed as images of books (query objects Q) in the bookshelf view Fa (see the upper right of FIG. 1). The query objects Q can be moved by a user operation (for example, swipe).

When a user moves two or more query items Q to the table view Fb, a plurality of item IDs corresponding to those query items Q are transmitted to the online shopping server 10, and it is determined in the server 10 whether there is a common item attribute (common attribute) between those items Q. When there are one or more common attributes, the common attribute is transmitted from the online shopping server 10 to the user terminal T. Then, on the interface F, a line L is drawn between the moved query items Q, and the attribute (common attribute) that is common between the items is displayed in a balloon B (see the lower left of FIG. 1).

Note that in the case where there are a plurality of common attributes between items, a plurality of sets of the line L and the balloon B indicating the common attributes are displayed as shown in FIG. 2(a). In the example of FIG. 2(a), three common attributes ("2004", "author A" and "magazine K") are displayed between the items Q. Further, although only two books are displayed in the table view Fb in FIG. 1, in the case where three or more books are displayed also, those books are grouped together in the form that lines are drawn between the books or those books are displayed together. In the example shown in FIG. 2(b), the attributes Ba ("2004") and Bb ("author A") that are common among three items Q in the table view Fb and the lines La and Lb corresponding to those common attributes are displayed.

On the other hand, when there is no common attribute, the line and the balloon are not displayed.

Referring back to FIG. 1, assuming that one or more balloons (common attributes) are displayed, when one of them is selected by tapping or the like, a request for recommended items is sent to the online shopping server 10 by the program. In response to the request, information of recommended items is provided from the server 10, and the information is displayed as images of books (recommended objects R) in the table view Fb (see the lower right of FIG. 1). The order of display of recommended items is arbitrary. For example, the items may be arranged in lexical order of item names or in order of sale date, or may be arranged in a random order. In the case where the display area in the table view Fb is smaller compared with the number of recommended items, some of the provided recommended items are displayed initially. Because the recommended items are items corresponding to the common attribute displayed in the balloon, the common attribute is grounds for recommendation.

Note that, when only one balloon (common attribute) is displayed, the program may transmit a request for recommended items to the online shopping server 10 automatically without waiting for a user operation.

There can be a case where a user vacillates on the choice of a common attribute as a result that too many common attributes are displayed when two books are selected. In consideration of such a case, the interface F may be configured so that a user can add another book to the table view Fb when the number of common attributes exceeds a predetermined number. A user can thereby narrow down the number of common attributes.

A user can make operations on the query items and the recommended items in the table view Fb even after the recommended items are displayed. Specifically, a user can move the books Q that have been moved to the table view Fb back to the bookshelf view Fa. In this case, the interface F deletes the line L indicating the common attribute corresponding to the books Q and further deletes the recommended items R corresponding to the common attribute.

Further, a user can move the recommended item R to the bookshelf view Fa and thereby register it as a favorite. Data about the recommended item R that is moved to the bookshelf view Fa is stored into a favorite database 13 (FIG. 5), which is described later. Further, a user can select the recommended item R and view the webpage of that item or perform the purchase procedure of that item on the web page. In this case, data related to a viewing history or a purchase history is stored into a viewing history database 11 or a purchase history database 12, which are described later.

Further, a user can make operations on the query item Q that is associated with another query item Q by a line or the like in the table view Fb and thereby change the distance between the query items Q. At this time, the interface F switch the display (at least one of the content and the number) of the recommended items R corresponding to the plurality of query items Q in accordance with the distance.

Figure 3:
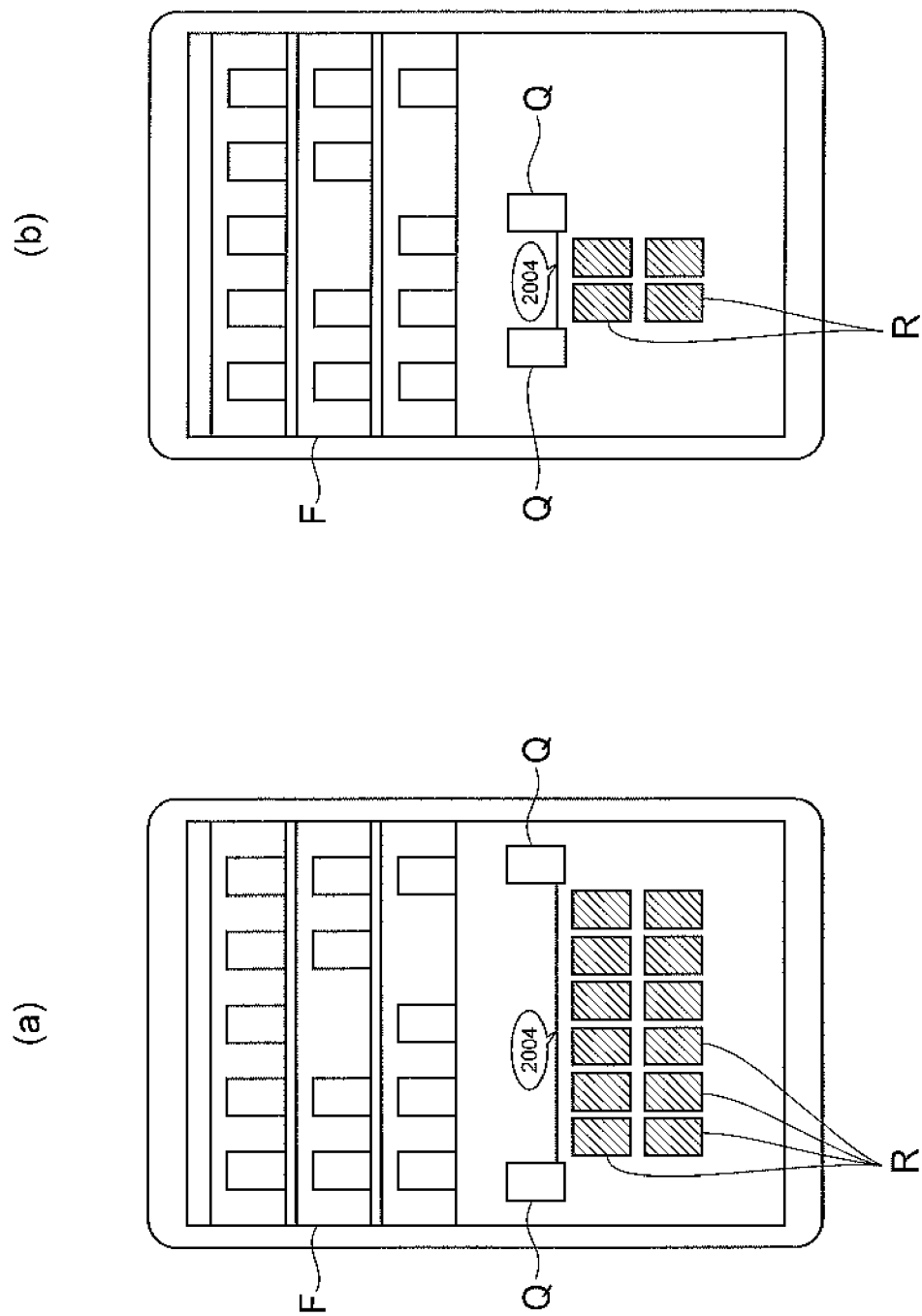
FIG. 3(a)(b) is a diagram showing a display example of recommended items.

FIG. 3 shows an example of the above case. FIG. 3(a) is the same as the lower right part of FIG. 1, and twelve books R are displayed as recommended items. On the other hand, in FIG. 3(b), the distance between the query items is shorter than that in FIG. 3(a) and therefore only four books R are displayed. When changing the display based on the distance, the interface F may continue to display as least some of the recommended items before change, or completely reshuffle all the recommended items before and after change (so-called shuffle-show). Because information of recommended items is acquired from the online shopping server 10 and stored in a memory in the user terminal T, the interface F can read the information of the recommended items to be displayed next from the memory at the time of change.

Further, a user can completely reshuffle all the recommended items being displayed by another technique (shuffle operation). A method of the shuffle operation may be swipe that superimposes two query items once and then separates them again, double tapping on one query item, clicking on a button for shuffle located on the interface F, tapping on the line L or the like, for example, though a method of the operation is arbitrary. Given such an operation, the interface F executes the shuffle operation. The order of display of recommended items that are sequentially displayed by the shuffle operation may be set on the basis of item attributes such as in lexical order of item names or in order of sale date, or may be in a random order.

Figure 4:
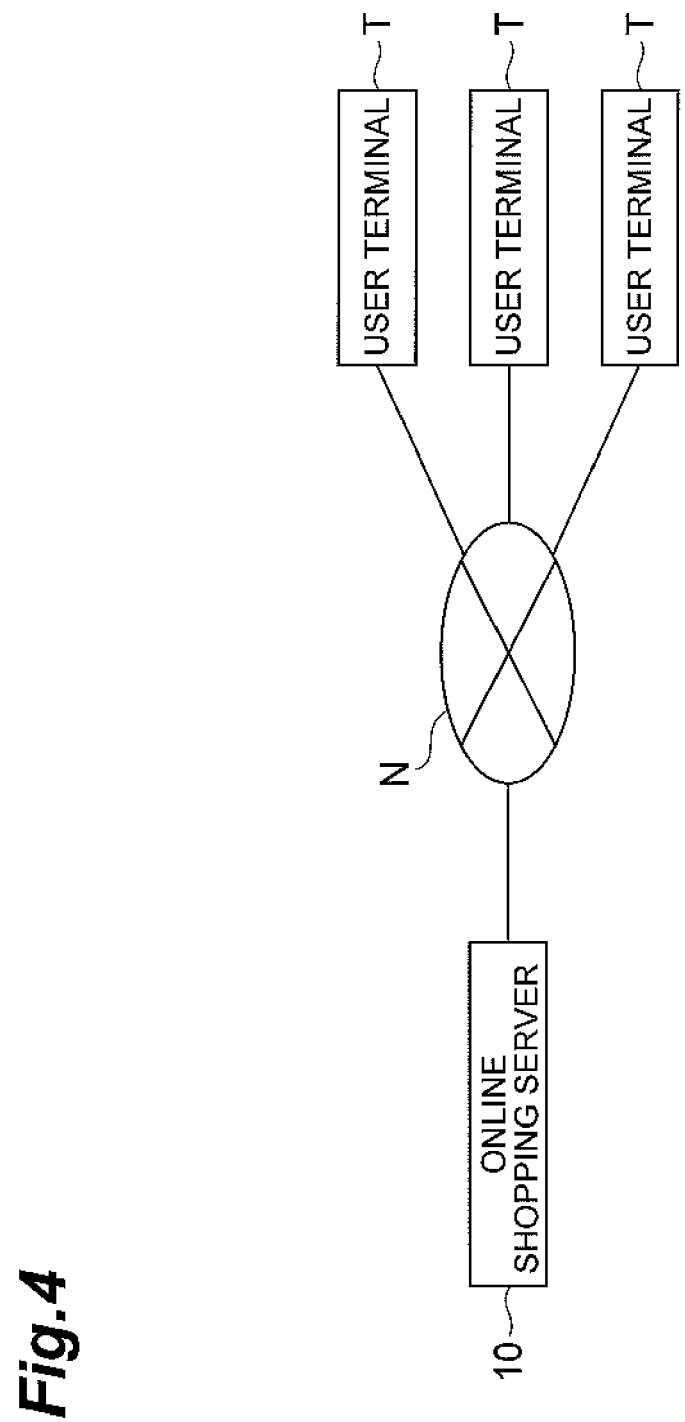
FIG. 4 is a diagram showing an overall configuration of a system according to an embodiment.

Based on the above assumption, the online shopping server 10 is described hereinbelow. As shown in FIG. 4, the online shopping server 10 is connected with one or more user terminals T through a communication network N. Although three user terminals T are shown in FIG. 4, the number of user terminals T is not particularly limited.

Figure 5:
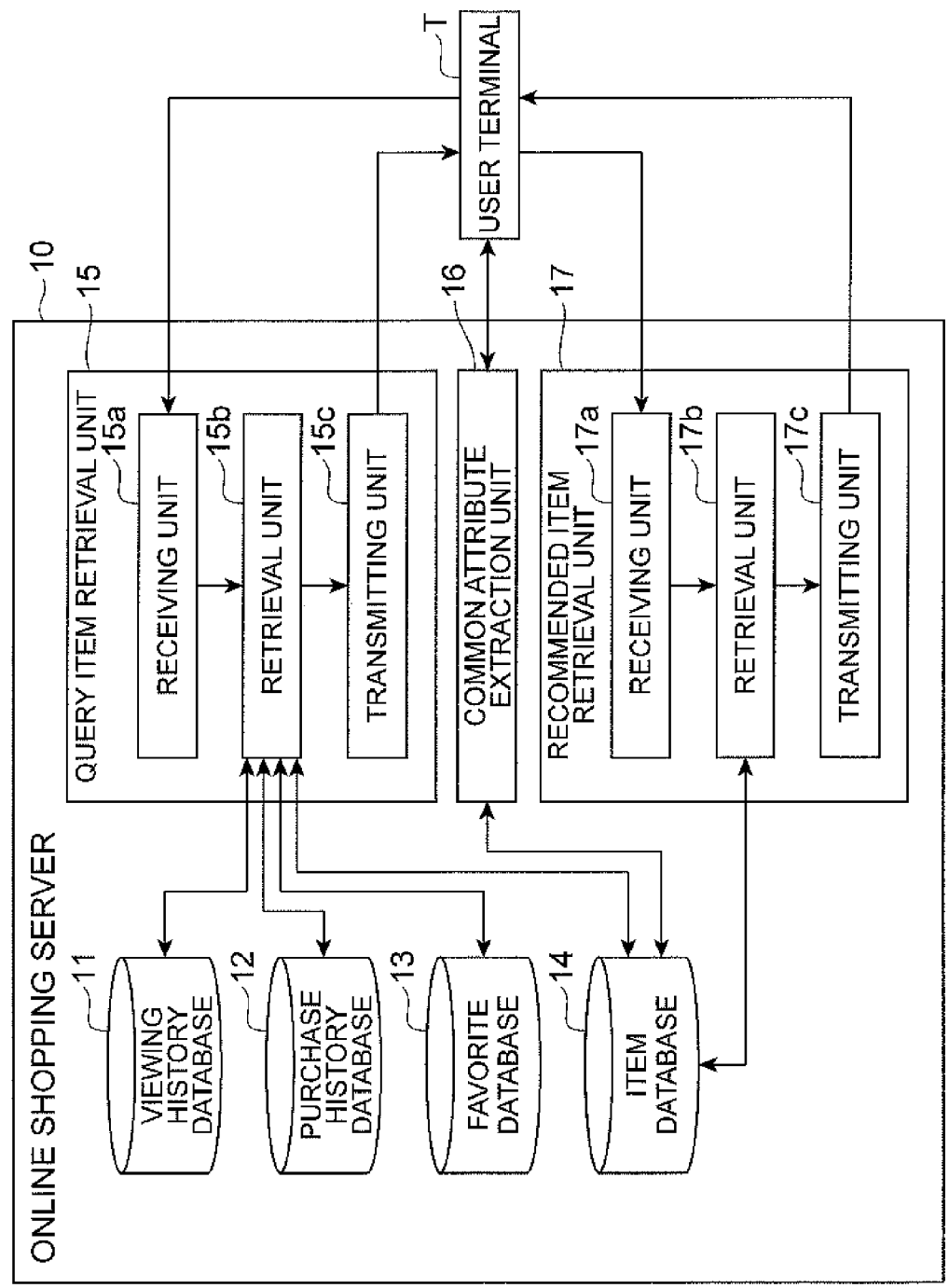
FIG. 5 is a block diagram showing a functional configuration of an online shopping server shown in FIG. 4.

As shown in FIG. 5, the online shopping server 10 includes a viewing history database 11, a purchase history database 12, a favorite database 13, an item database 14, a query item retrieval unit 15, a common attribute extraction unit 16, and a recommended item retrieval unit 17, as functional components.

Figure 6:
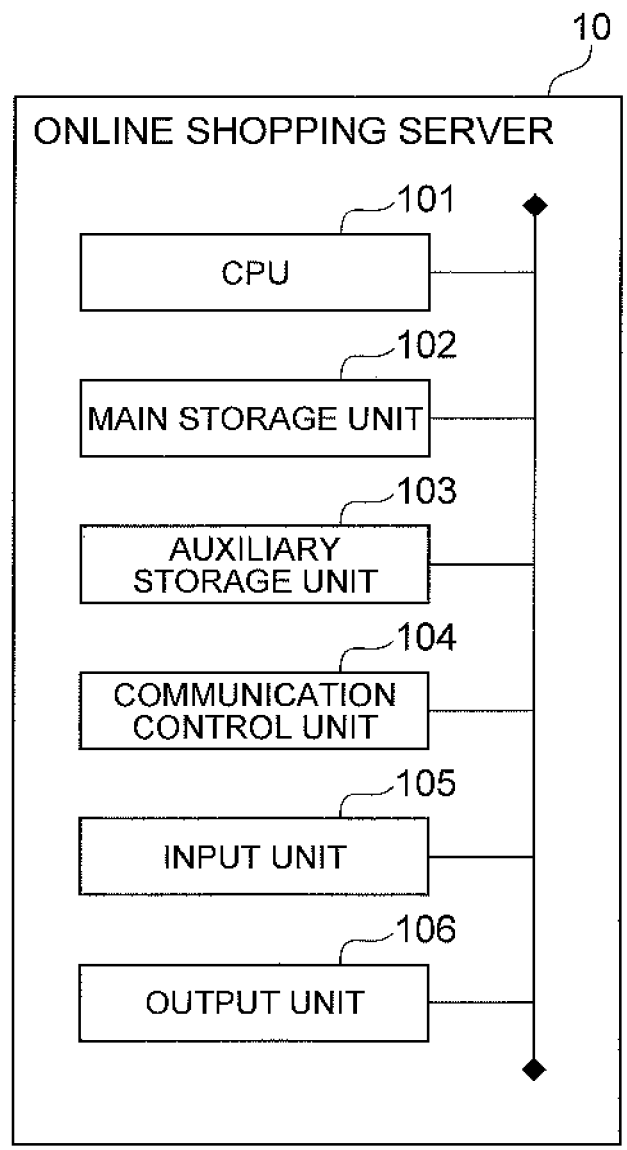
FIG. 6 is a diagram showing a hardware configuration of the online shopping server shown in FIG. 4.

As shown in FIG. 6, the online shopping server 10 is composed of a CPU 101 that executes an operating system, an application program and the like, a main storage unit 102 such as ROM and RAM, an auxiliary storage unit 103 such as a hard disk, a communication control unit 104 such as a network card, an input unit 105 such as a keyboard and a mouse, and an output unit 106 such as a monitor. The functions of the online shopping server 10 are implemented by loading given software onto the CPU 101 or the main storage unit 102, making the communication control unit 104, the input unit 105, the output unit 106 and the like operate under control of the CPU 101, and performing reading and writing of data in the main storage unit 102 or the auxiliary storage unit 103. The data and database required for processing are stored in the main storage unit 102 or the auxiliary storage unit 103.

Note that, although the online shopping server 10 is composed of one computer in the example of FIG. 6, the functions of the server may be distributed among a plurality of computers. For example, the online shopping server 10 may be composed of a computer that includes the databases shown in FIG. 5 and a computer that includes the other functional components.

Referring back to FIG. 5, the viewing history database 11 is a means of storing viewing history data indicating that a user has viewed an item on an online shopping site. The viewing history data is generated by a means of monitoring access to the site (not shown) and stored into the viewing history database 11. The viewing history data is a log in which a user ID that uniquely identifies a user, an item ID that uniquely identifies an item, and access date and time are associated with one another. The item ID of the viewing history data is ID of an item which is shown on the accessed site. Note that the viewing history data should contain at least the user ID and the item ID in association with each other, and it may or may not contain information other than those IDs.

The purchase history database 12 is a means of storing purchase history data indicating that a user has purchased an item on an online shopping site. The purchase history data is generated by a means of executing a purchase process (not shown) and stored into the purchase history database 12. The purchase history data is a log in which a user ID that uniquely identifies a user, an item ID that uniquely identifies an item, and other information such as purchase date and time, payment method and delivery method are associated with one another. The item ID of the purchase history data is ID of a purchased item. Note that the purchase history data should also contain at least the user ID and the item ID in association with each other, and it may or may not contain information other those IDs.

The favorite database 13 is a means of storing favorite data indicating an item which a user has registered as a favorite. A user can register a favorite item on an online shopping site or register a recommended item displayed in the interface F as a favorite. The favorite data is generated by a means of accepting a user's registration process (not shown) and stored into the favorite database 13. The favorite data is a log in which a user ID that uniquely identifies a user, an item ID that uniquely identifies an item, and registration date and time are associated with one another. The item ID of the favorite data is ID of the item which is selected by a user at the time of registration. Note that the favorite data should also contain at least the user ID and the item ID in association with each other, and it may or may not contain information other than those IDs.

The item database 14 is a means of storing item information related to an item. The item information is information in which an item ID that uniquely identifies an item and an attribute of the item are associated with each other. Information to be set as the item attribute may be determined arbitrarily in accordance with the type and characteristics of an item. For example, in the item information shown in FIG. 7 which relates to books, attributes such as an item name, author, era, publication on magazines, publisher and item image are set.

Note that the item database 14 may be placed independently of an item database for item purchase processing or integrated with the database.

The query item retrieval unit 15 is a means of retrieving information about query items (which is referred to hereinafter as "query item information") based on an instruction from the user terminal T and transmitting a retrieval result to the user terminal T. The query item retrieval unit 15 includes a receiving unit 15a, a retrieval unit 15b, and a transmitting unit 15c.

The receiving unit 15a is a means of receiving a request for query items from the user terminal T. The request contains a user ID that indicates a terminal user. The receiving unit 15a outputs the user ID to the retrieval unit 15b.

The retrieval unit 15b is a means of retrieving query items based on the user ID that is input from the receiving unit 15a.

Specifically, the retrieval unit 15b reads the viewing history data, the purchase history data and the favorite data corresponding to the user ID from the viewing history database 11, the purchase history database 12 and the favorite database 13, respectively. Note that the three kinds of data is not necessarily read, and only one or two kinds of data is read in some cases. Further, the redundant item IDs are combined into one ID. Then, the query item retrieval unit 15 reads the item information corresponding to each of the read item IDs as query item information (first item information) from the item database 14.

Then, the retrieval unit 15b generates an object (query object) of each query item based on the one or more read query item information. As shown in FIG. 1, the query object is to visualize a query item as an image of a book on the interface F, and it can be manipulated on the interface F. The query object contains at least part of the query item information that is required for display and manipulation on the interface F. The retrieval unit 15b outputs one or more generated query objects to the transmitting unit 15c.

The transmitting unit 15c is a means of transmitting the one or more input query objects as a retrieval result to the user terminal T. At least part of the query item information as shown in FIG. 7 is thereby sent to the user terminal T, and one or more query items are displayed in the bookshelf view Fa as shown in FIG. 1.

Note that the query item retrieval unit 15 may receive search criteria other than a user ID from the user terminal T and retrieve and transmit the query item information that matches the search criteria as well. The search criteria may be "only the item registered as a favorite", "the item purchased in the recent one year" or a given keyword or the like, for example, though any search criteria can be used.

The common attribute extraction unit 16 is a means of extracting an item attribute (common attribute) that is common to a plurality of query items selected in the interface F, which are, a plurality of query items moved to the table view Fb.

The common attribute extraction unit 16 receives a plurality of item IDs corresponding to a plurality of query items moved to the table view Fb from the user terminal T and then reads the item information corresponding to those item IDs from the item database 14. The common attribute extraction unit 16 then compares the plurality of read item information and determines whether there is a common attribute.

Specifically, the common attribute extraction unit 16 recognizes the item attribute that is the same among a plurality of query items as the common attribute or, when a plurality of common attributes corresponding to a plurality of query items are included in the same superordinate concept (including the case where a plurality of common attributes have the relation of similarity), recognizes the superordinate concept as the common attribute. Further, when the item attribute of one query item includes the item attribute of the other query item (which is the case where the relation of inclusion is made), the common attribute extraction unit 16 may recognize the item attribute in the superordinate level as the common attribute. Note that the correspondence relation can be defined arbitrarily. In any case, the common attribute extraction unit 16 can extract one or more common attributes for one set of query items.

In the case where one or more common attributes can be extracted, the common attribute extraction unit 16 transmits the common attributes to the user terminal T. The line L and the balloon B are thereby displayed on the interface F as shown in FIG. 1. On the other hand, in the case where any common attribute cannot be extracted, the common attribute extraction unit 16 transmits information indicating that there is no common attribute to the user terminal T. In this case, the line L and the balloon B are not displayed on the interface F.

The recommended item retrieval unit 17 is a means of retrieving information related to recommended items (which is referred to hereinafter as "recommended item information") based on an instruction from the user terminal T and transmitting a retrieval result to the user terminal T. The recommended item retrieval unit 17 includes a receiving unit (acquisition means) 17a, a retrieval unit (retrieval means) 17b, and a transmitting unit (output means) 17c.

The receiving unit 17a is a means of receiving a request for recommended items from the user terminal T. The request contains information indicating a common attribute selected on the interface F and two or more item IDs indicating two or more query items selected on the interface F and associated through the common attribute. The receiving unit 17a outputs the information of the common attribute and the two or more item IDs to the retrieval unit 17b.

The retrieval unit 17b is a means of retrieving recommended items based on the information input from the receiving unit 17a. First, the retrieval unit 17b recognizes the input information of the common attribute as it is. Next, the retrieval unit 17b reads the item information having the item attribute corresponding to the recognized common attribute and having the item ID different from any of the two or more input item IDs as the recommended item information (second item information) from the item database 14. The recommended item corresponding to the common attribute is an item having the item attribute that matches the common attribute or the item attribute in the relation of inclusion or in the relation of similarity with the common attribute. Note that the correspondence relation can be defined arbitrarily. Further, the correspondence relation may be input as a part of the search criteria by a user in the user terminal T and sent to the online shopping server 10.

Then, the retrieval unit 17b generates an object (recommended object) of each recommended item based on the one or more read recommended item information. As shown in FIG. 1, the recommended object is to visualize a recommended item as an image of a book on the interface F, and it can be manipulated on the interface F. The recommended object contains the recommended item information. The retrieval unit 17b outputs the one or more generated recommended objects to the transmitting unit 17c.

The transmitting unit 17c is a means of transmitting the one or more input recommended objects (recommended item information) as a retrieval result to the user terminal T. One or more query items R are thereby displayed together with the corresponding common attribute B on the table view Fb as shown in FIG. 1.

Hereinafter, the operation of the online shopping server 10 is described and also an information providing method according to this embodiment is described with reference to FIGS. 8 and 9.

Figure 8:
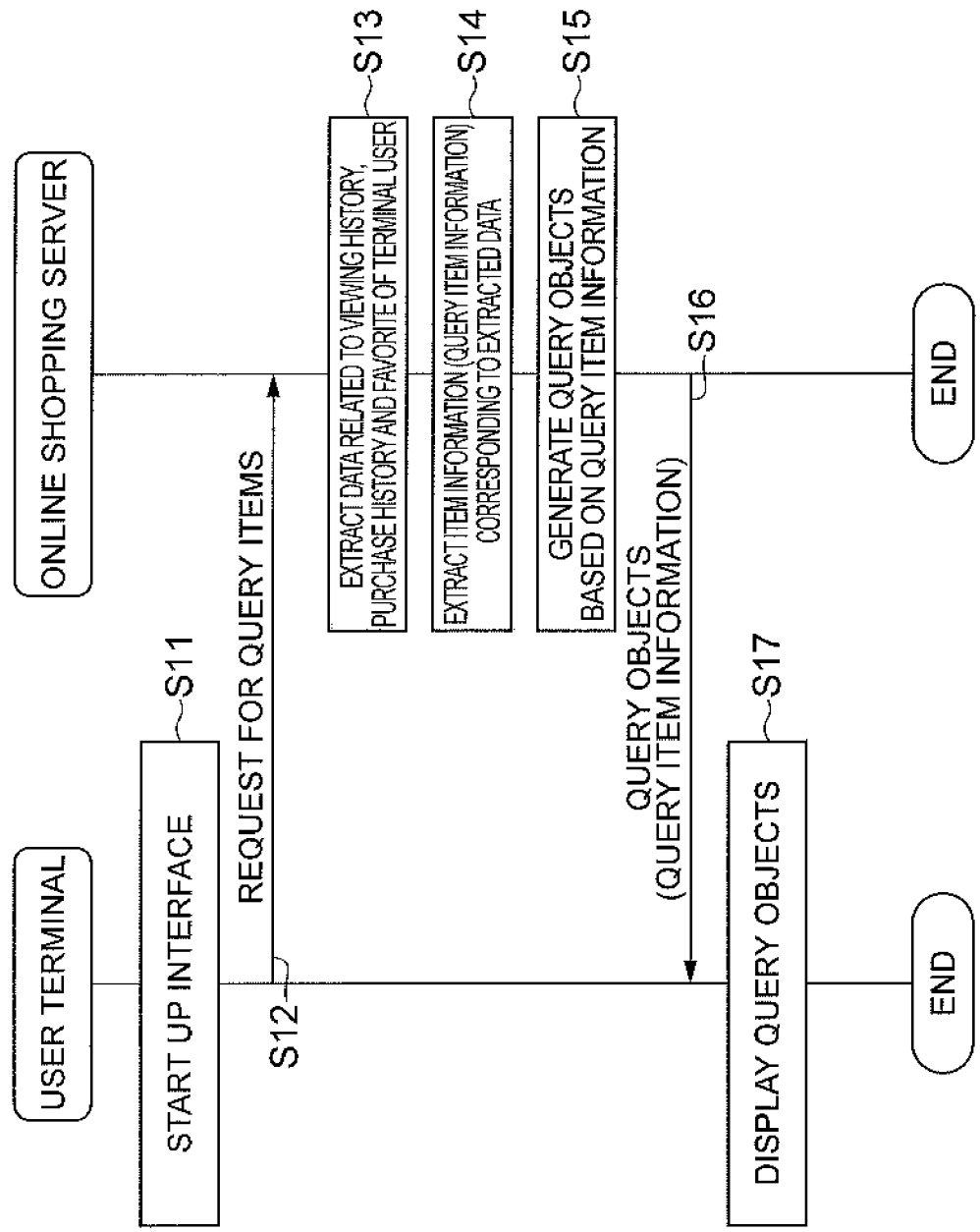
FIG. 8 is a sequence chart showing an operation of a system related to display of query items.

Display of query items is performed as shown in FIG. 8. Specifically, when the interface F starts on the user terminal T (Step S11), a request for query items is transmitted to the online shopping server 10 (Step S12). In the online shopping server 10, the query item retrieval unit 15 performs the following process based on the request.

First, the receiving unit 15a receives the request for query items (Step S12). Next, the retrieval unit 15b extracts the viewing history data, the purchase history data and the favorite data corresponding to the user ID contained in the request from the databases 11, 12 and 13, respectively (Step S13). Then, the retrieval unit 15b extracts the item information corresponding to the item ID of each of the extracted data as the query item information (Step S14) and generates query objects based on the query item information (Step S15). Finally, the transmitting unit 15c transmits the query objects to the user terminal T (Step S16).

The transmitted query objects are received by the user terminal T and displayed on the bookshelf view Fa (Step S17).

Figure 9:
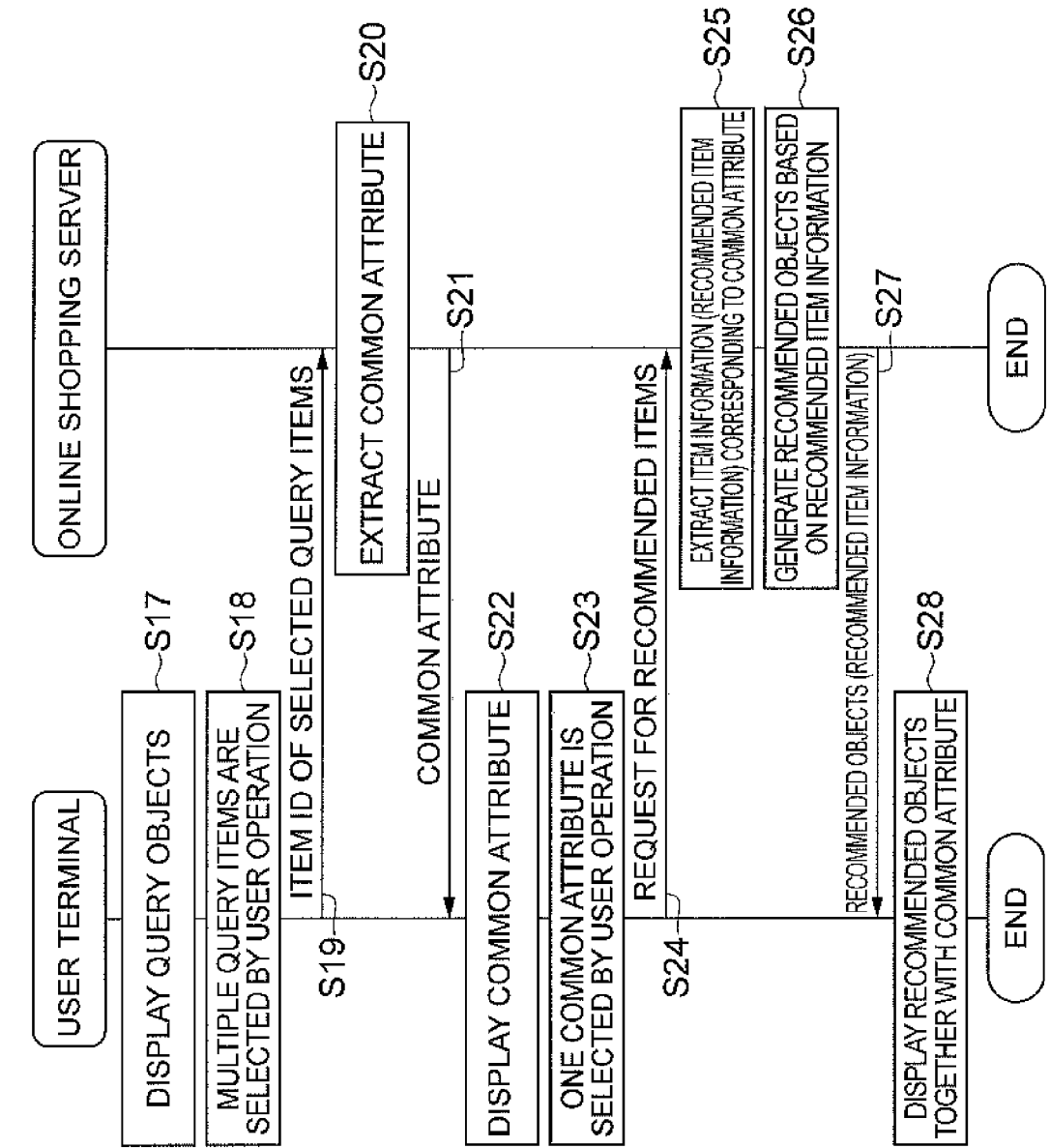
FIG. 9 is a sequence chart showing an operation of a system related to display of recommended items.

Display of recommended items on the basis of a user operation on query items is performed as shown in FIG. 9. Specifically, when a plurality of query items are moved to the table view Fb by a user operation and thereby those query items are selected (Step S18), the item IDs of the query items are transmitted to the online shopping server 10 (Step S19).

In the online shopping server 10, the common attribute extraction unit 16 reads the item information of the query items from the item database 14 and extracts the common attribute based on the item information (Step S20). Then, the common attribute extraction unit 16 transmits the extracted common attribute to the user terminal T (Step S21).

In the user terminal T, the interface F displays the common attribute (Step S22). After that, when one common attribute is selected by a user operation (Step S23), a request for recommended items is transmitted to the online shopping server 10 (Step S24). In the online shopping server 10, the recommended item retrieval unit 17 performs the following process based on the request.

First, the receiving unit 17a receives the request for recommended items (Step S25, acquisition step). Next, the retrieval unit 17b acquires the recommended item information using the common attribute contained in the request and the item IDs of the query items. Specifically, the retrieval unit 17b extracts the item information whose item attribute corresponds to the common attribute and whose item ID is different from the item IDs of the query items as the recommended item information (Step S21, retrieval step). Then, the retrieval unit 17b generates the recommended objects based on the recommended item information (Step S26). Finally, the transmitting unit 17c transmits the recommended objects to the user terminal T (Step S27, output step).

The transmitted recommended objects are received by the user terminal T and displayed together with the common attribute on the table view Fb (Step S28).

Figure 10:
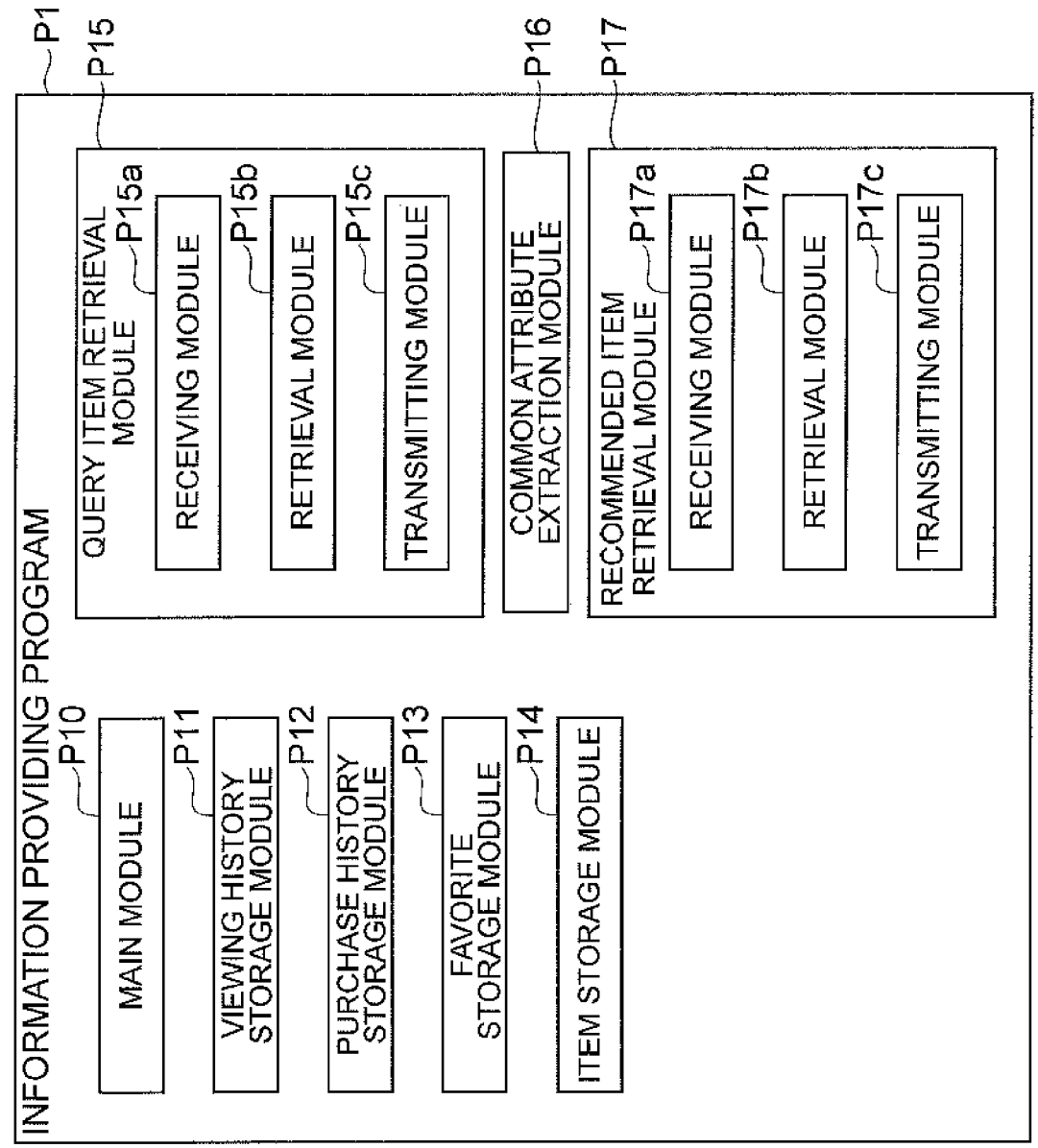
FIG. 10 is a block diagram showing a configuration of an information providing program according to an embodiment.

Hereinafter, an information providing program P1 that causes a computer to function as the online shopping server 10 is described with reference to FIG. 10.

An information providing program P1 includes a main module P10, a viewing history storage module P11, a purchase history storage module P12, a favorite storage module P13, an item storage module P14, a query item retrieval module P15, a common attribute extraction module P16, and a recommended item retrieval module P17. The query item retrieval module P15 includes a receiving module P15a, a retrieval module P15b and a transmitting module P15c. The recommended item retrieval module P17 includes a receiving module P17a, a retrieval module P17b and a transmitting module P17c.

The main module P10 is a part that exercises control over the information providing functions. The functions implemented by executing the viewing history storage module P11, the purchase history storage module P12, the favorite storage module P13, the item storage module P14, the query item retrieval module P15, the common attribute extraction module P16 and the recommended item retrieval module P17 are equal to the functions of the viewing history database 11, the purchase history database 12, the favorite database 13, the item database 14, the query item retrieval unit 15, the common attribute extraction unit 16 and the recommended item retrieval unit 17, respectively. The functions implemented by executing the receiving module P15a, the retrieval module P15b and the transmitting module P15c are equal to the functions of the receiving unit 15a, the retrieval unit 15b and the transmitting unit 15c, respectively. The functions implemented by executing the receiving module P17a, the retrieval module P17b and the transmitting module P17c are equal to the functions of the receiving unit 17a, the retrieval unit 17b and the transmitting unit 17c, respectively.

The information providing program P1 is provided in the form of being recorded in a static manner on a recording medium such as CD-ROM, DVD, ROM or semiconductor memory, for example. Further, the information providing program P1 may be provided as a data signal superimposed onto a carrier wave through a communication network.

As described above, according to this embodiment, recommended items corresponding to a common attribute of a plurality of query items selected by a user are extracted. Then, information of the recommended items and the common attribute are displayed on the user terminal T. In this manner, by displaying not only information of items (recommended items) related to selected items but also a common item attribute, which is a common point of items, used for extracting the information, it is possible to let a user know from what point of view the recommended items are extracted. By visualizing the common attribute as well, it is possible to recommend items to a user in a user-friendly manner.

When searching for another item from a viewing history, a purchase history or a favorite, a user sometimes has a desire such as "want to find other books of this author" or "want to take a look at other books in this era". However, in the recommendation interface according to related art, a system merely makes a recommendation for related items in a one-sided manner and such a desired cannot be satisfied. In this embodiment, by visualizing a common attribute and displaying other items having a common item attribute to a selected item, it is possible to satisfy a user's desire as above.

In this embodiment, a user can view recommended items corresponding to the common attribute selected by oneself. Further, a user can change the number of displayed recommended items or switch information of recommended items in accordance with the distance between the displayed query items. In addition, in this embodiment, recommended items are arranged in the order on the basis of a specified item attribute and displayed. In this manner, it is possible to display recommended items in such a way that is easy to view for a user or easy to understand for a user in this embodiment.

Figure 2:
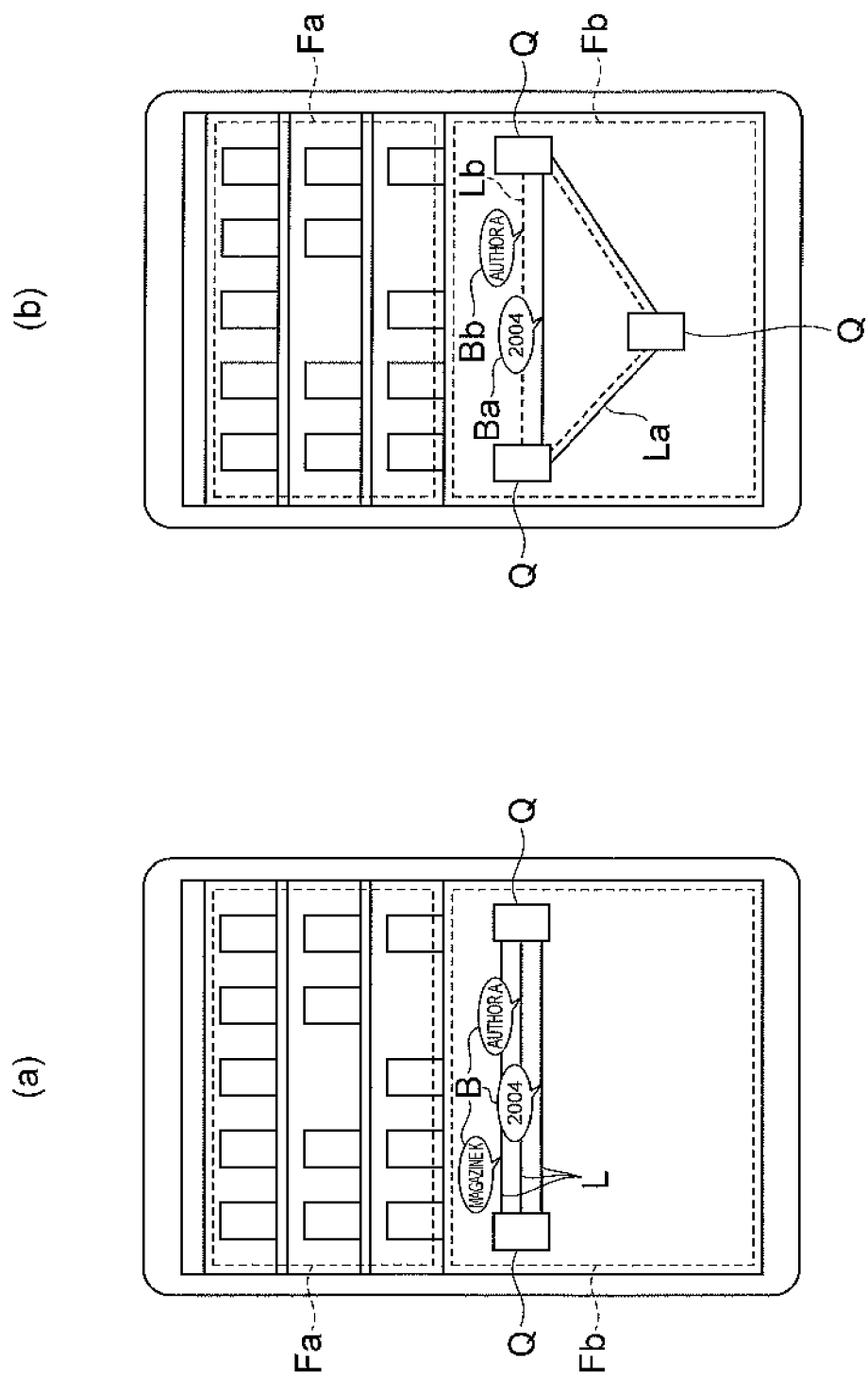
FIG. 2(a)(b) is a diagram showing another display example of a user interface.

Further, as shown in FIGS. 1 to 3, by configuring the interface so that selection of query items and display of recommended items and a common attribute can be made in one screen, it is possible to make an interactive search, eliminating the transition between pages, which has been an issue in the existing electronic commerce (EC) sites. In this embodiment, because a common attribute and recommended items are displayed dynamically without screen transition, the interface is user-friendly particularly when a user searches for an item by trial and error.

Hereinbefore, the present invention has been described in detail with respect to the embodiment thereof. However, the present invention is not limited to the above-described embodiment. Various changes and modifications may be made therein without departing from the scope of the invention.

The configuration of a server to which the information providing device is applied is not limited to the above-described embodiment and can be designed in any way. For example, the recommendation functions (the query item retrieval unit 15, the common attribute extraction unit 16 and the recommended item retrieval unit 17) may be prepared as a recommendation server, separately from the online shopping server 10. Further, the databases shown in FIG. 5 may be placed in different systems from one another, and the recommendation server may access each system to read various data.

Although items that have been viewed, purchased or registered as a favorite by a user are displayed as query items on the interface F in the above-described embodiment, only some of those three kinds of items may be used as candidates for query items. For example, only items that have been viewed or purchased by a user may be used as candidates for query items. Further, in the case where query items corresponding to a user ID of a terminal user are not found, the query item retrieval unit 15 may extract query items based on rules previously prepared on the server side (for example, a rule that extracts ten items in order of popularity) or search criteria input through the user terminal T.

If a projector is used as a display device and a camera that photographs a projection area is mounted, it is possible to use an actual item or a printed copy of an item image instead of query items and retrieve and display an item corresponding to that item. To be specific, an actual item or a printed copy of an item placed on a projection area such as on a desk is photographed by the camera, and the photographic data is transmitted to the information providing device (server). Then, in the information providing device, the photographic data is analyzed by a specified image recognition process and thereby the photographed item is identified. Further, the common attribute of the identified item is extracted by searching the item database. After that, information of recommended items corresponding to the common attribute are retrieved and transmitted together with information of the common attribute to the projector, and the recommended items are projected together with the common attribute. In this case, the functions equivalent of the query item retrieval unit 15 in the above-described embodiment may be omitted.

Note that examples of a technique to identify an item from photographic data are described in the following reference literatures 1 and 2.

Reference Literature 1: Masaki Masuda, "Amazon's Offial Apps with "Photo Search" Gaining Popularity", [online], Jun. 7, 2010 [searched on Aug. 24, 2010], Internet <URL: http://techwave.jp/archives/51461554.html>

Reference Literature 2: "Free iPhone Apps Offered by Amazon, Including "Photo Search" using Camera", [online], Jun. 18, 2010 [searched on Aug. 24, 2010], Internet <URL: http://web-tan.forum.impressrd.jp/e/2010/06/18/8185>

Although the online shopping server 10 extracts a common attribute in response to a request from the user terminal T and transmits the common attribute to the user terminal T in the above-described embodiment, the user terminal T may specify a common attribute based on the query item information and display the common attribute. In this case, the functions equivalent of the common attribute extraction unit 16 may be omitted in the online shopping server 10. In any case, the retrieval unit 17b recognizes the input common attribute as it is as the common attribute and retrieves recommended items.

Although all the recommended items that can be extracted are extracted at a time and transmitted to the user terminal T in the process of retrieving recommended items in the above-described embodiment, the retrieval process may be performed in the online shopping server 10 each time a shuffle operation or an operation to change the distance between query items is performed in the user terminal T. In this case, the item IDs of the currently displayed recommended items are also transmitted to the online shopping server 10, and other recommended items having item IDs different from those item IDs are retrieved.

Although items corresponding to the common attribute are displayed as recommended items on the interface F in the above-described embodiment, the present invention may be used with the view of simply presenting related items, not as recommendation (suggestion).

Figure 11:
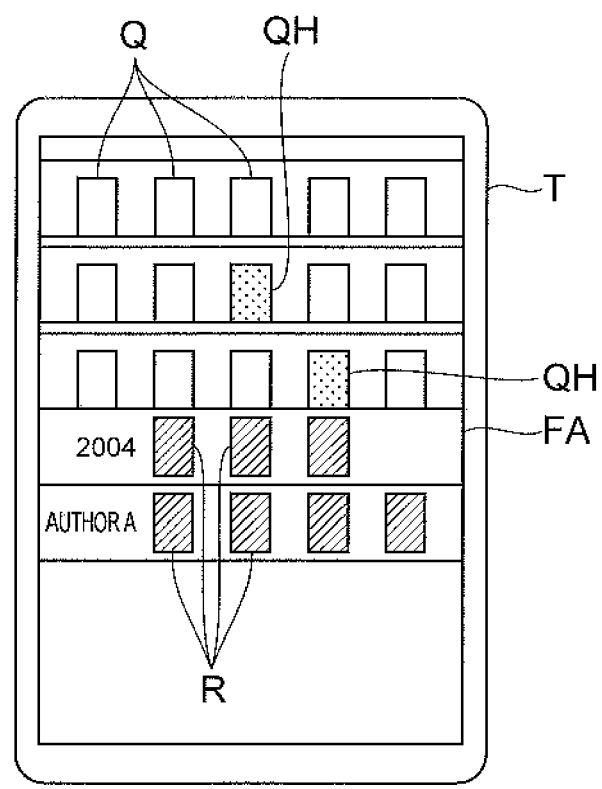
FIG. 11 is a diagram showing a user interface according to an alternative example.

The configuration (screen design) of the interface can be determined arbitrarily as described above, and FIG. 11 shows an alternative example. In an interface FA shown in FIG. 11, query items Q are selectable by tapping, and a plurality of selected query items are highlighted (see the reference symbol QH). Then, recommended items R that are retrieved based on the plurality of query items QH are displayed in the area (lower area) in the lower half of the screen. In this case, the common attribute is displayed at the left end of the lower area, and the corresponding recommended items R are sequentially displayed on the right side of the common attribute. In the example of FIG. 11, two common attributes, the era ("2004") and the author ("author A"), are displayed.

With regard to the screen design, the interface may be configured so that a screen to display query items and a screen to display a common attribute and recommended items are independent of each other, and those screens are displayed alternately by switching between one another.

Figure 12:
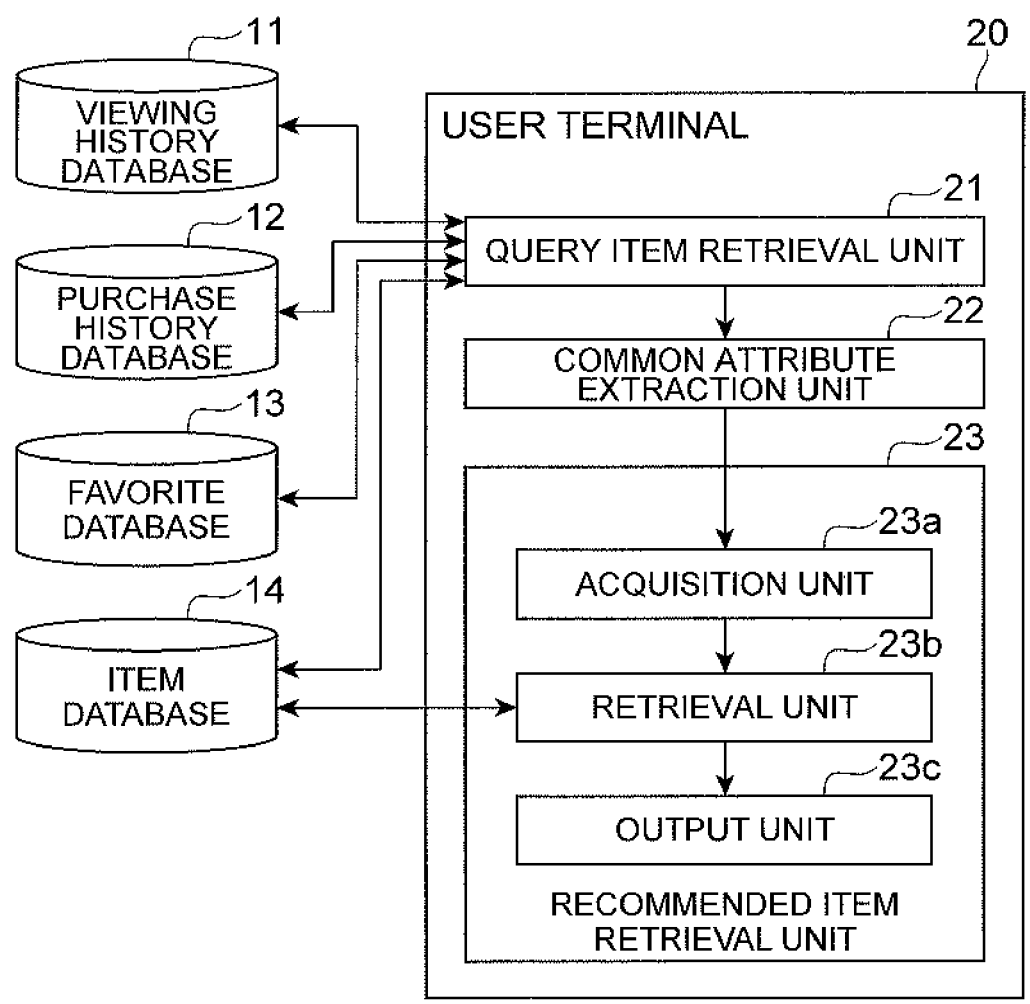
FIG. 12 is an overall configuration of a system according to an alternative example.

Although one embodiment of the present invention is applied to the online shopping server 10 in the above-described embodiment, one embodiment of the present invention may be applied to a user terminal. This alternative example is described with reference to FIG. 12. Note that, however, those that are the same or equivalent to those described in the above embodiment are not redundantly described.

A user terminal 20 can read or write data to databases by accessing the viewing history database 11, the purchase history database 12, the favorite database 13 and the item database 14 through the communication network N which is the same as the one described in the above embodiment. The user terminal 20 also has the function of displaying the interface F shown in the above embodiment. In the user terminal 20, a query item retrieval unit 21, a common attribute extraction unit 22 and a recommended item retrieval unit 23 are executed.

The query item retrieval unit 21 has the same functions as the query item retrieval unit 15 in the above-described embodiment. The query item retrieval unit 21 receives a request for query items that is input by a user and, in response to the request, reads the viewing history data, the purchase history data or the favorite data corresponding to a user ID from the viewing history database 11, the purchase history database 12 or the favorite database 13. The query item retrieval unit 21 then reads the item information corresponding to each of the read item IDs as query item information from the item database 14. Then, the query item retrieval unit 21 generates query objects based on the read query item information and displays the query objects on the interface F. One or more query items Q are thereby displayed in the bookshelf view Fa as shown in FIG. 1.

The common attribute extraction unit 22 has the same functions as the common attribute extraction unit 16 in the above-described embodiment.

The recommended item retrieval unit 23 has the same functions as the recommended item retrieval unit 17 in the above-described embodiment. The recommended item retrieval unit 23 includes an acquisition unit (acquisition means) 23a, a retrieval unit (retrieval means) 23b, and an output unit (output means) 23c.

The acquisition unit 23a acquires information indicating a common attribute that is selected by a user on the interface F and two or more item IDs indicating two or more query items that are selected on the interface F and associated through the common attribute. The acquisition unit 23a outputs those acquired information to the retrieval unit 23b.

The retrieval unit 23b retrieves recommended items based on the information input from the acquisition unit 23a. The retrieval unit 23b reads the item information having the item attribute corresponding to the input common attribute and having the item ID different from any of the two or more input item IDs as the recommended item information (second item information) from the item database 14. Then, the retrieval unit 23b generates one or more recommended objects based on the one or more read recommended item information and outputs the recommended objects to the output unit 23c.

The output unit 23c displays the one or more input recommended objects as a retrieval result on the interface F. One or more query items R are thereby displayed together with the corresponding common attribute B on the table view Fb as shown in FIG. 1. After that, when a user performs an operation to move the recommended item R to the bookshelf view Fa in order to register that item R as a favorite, the user terminal 20 stores data related to the recommended item R into the favorite database 13.

REFERENCE SIGNS LIST

10 . . . online shopping server (information providing device), 11 . . . viewing history database, 12 . . . purchase history database, 13 . . . favorite database, 14 . . . item database, 15 . . . query item retrieval unit, 15a . . . receiving unit, 15b . . . retrieval unit, 15c . . . transmitting unit, 16 . . . common attribute extraction unit, 17 . . . recommended item retrieval unit, 17a . . . receiving unit (acquisition means), 17b . . . retrieval unit (retrieval means), 17c . . . transmitting unit (output means) F, FA . . . user interface, Fa . . . bookshelf view (first area), Fb . . . table view (second area), P1 . . . information providing program, P10 . . . main module, P11 . . . viewing history storage module, P12 . . . purchase history storage module, P13 . . . storage module, P14 . . . item storage module, P15 . . . query item retrieval module, P15a . . . receiving module, P15b . . . retrieval module, P15c . . . transmitting module, P16 . . . common attribute extraction module, P17 . . . recommended item retrieval module, P17a . . . receiving module, P17b . . . retrieval module, P17c . . . transmitting module, T and 20 . . . user terminal, 21 . . . query item retrieval unit, 22 . . . common attribute extraction unit, 23 . . . recommended item retrieval unit, 23a . . . acquisition unit (acquisition means), 23b . . . retrieval unit (retrieval means), 23c . . . output unit (output means)

The invention claimed is:

1. An information providing device comprising:
at least one memory operable to store program code;
at least one processor operable to read the program code and operate as instructed by the program code, the program code including:
    acquisition code configured to cause the at least one processor to, when two or more item images are selected by a user operation on a given screen of a terminal of the user that is displaying a plurality of item images indicating a plurality of query items in response to a request for query items from the user, acquire, for each of the selected item images, first item information including one or more item attributes related to an item indicated by the item image from an item database which stores one or more item attributes related to a plurality of items;
    common attribute extraction code configured to cause the at least one processor to, when a first item image displayed in response to a user request for the first item image and a second item image displayed in response to a user request for the second item image are selected by the user, compare first item information of the first item image and first item information of the second item image to determine a common item attribute;
    retrieval code configured to cause the at least one processor to read information of an item different from items indicated by the selected first and second item images and having at least a part of the common item attribute as second item information from the item database; and
    output code configured to cause the at least one processor to output to the terminal the second item information read by the retrieval code to display the second item information together with the common item attribute on the screen.

2. The information providing device according to claim 1, wherein,
when there are a plurality of common item attributes, the acquisition code causes the at least one processor to further acquire one common item attribute selected by the user, and
the retrieval code causes the at least one processor to recognize the one common item attribute acquired by the acquisition code and read information of an item different from items indicated by the selected first and second item images and having at least a part of the common item attribute as the second item information from the item database.

3. The information providing device according to claim 1, wherein
the number of second item information displayed on the screen is determined in accordance with a distance, on the screen, between the selected first and second item images, and, when the distance changes by a user operation, the number of displayed second item information changes in accordance with the distance after change.

4. The information providing device according to claim 1, wherein
a user interface displayed on the screen includes a first area to display the plurality of item images and a second area to display the first and second item images selected from the plurality of item images by the user, the second item information, and the common item attribute.

5. The information providing device according to claim 4, wherein the user interface is configured to accept a user operation to move the second item information displayed in the second area to the first area, and the second item information moved to the first area is stored into a specified database.

6. The information providing device according to claim 4, wherein the user interface is configured to accept a user operation to switch the second item information displayed in the second area to different second item information, and the displayed second item information is switched by the user operation.

7. The information providing device according to claim 6, wherein the second item information is arranged in an order based on a specified item attribute, and the second item information is displayed alternately by switching between one another in accordance with the order.

8. The information providing device according to claim 1, wherein the first item information is information extracted by referring to a database that stores at least one of data indicating a history of viewing of item pages by a user, data indicating a history of item purchase by a user, and data indicating items registered as a favorite by a user's specified operation.

9. An information providing method executed by an information providing device, the method comprising:

when two or more item images are selected by a user operation on a given screen of a terminal of the user that is displaying a plurality of item images indicating a plurality of query items in response to a request for query items from the user, acquiring, for each of the selected item images, first item information including one or more item attributes related to an item indicated by the item image from an item database which stores one or more item attributes related to a plurality of items;

when a first item image displayed in response to a user request for the first item image and a second item image displayed in response to a user request for the second item image are selected by the user, comparing first item information of the first item image and first item information of the second item image to determine a common item attribute;

reading information of an item different from items indicated by the selected first and second item images and having at least a part of the common item attribute as second item information from the item database; and outputting to the terminal the second item information to display the second item information together with the common item attribute on the screen.

* * * * *